Figure 1:
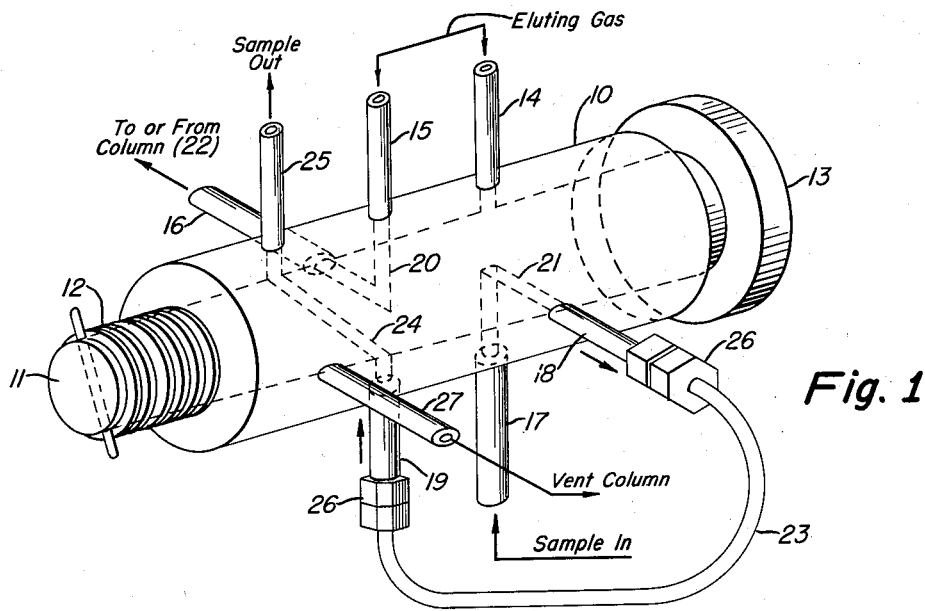

Feb. 28, 1961 J. C. LAMKIN 2,972,888
FLUID SAMPLING AND INJECTION VALVE
Filed June 25, 1957 2 Sheets-Sheet 1

INVENTOR.
John C. Lamkin
BY
Everett A. Johnson
ATTORNEY

United States Patent Office 2,972,888
Patented Feb. 28, 1961

2,972,888

FLUID SAMPLING AND INJECTION VALVE

John C. Lamkin, Independence, Mo., assignor to Standard Oil Company, Chicago, Ill., a corporation of Indiana Filed June 25, 1957, Ser. No. 667,890

1 Claim. (Cl. 73—422)

This invention is related to injecting small samples of fluids into a flowing stream. More particularly it pertains to a device for injecting measured samples of gases or liquids into a flowing gas stream as may be done in connection with gas chromatographic analysis.

In gas chromatography uniform sized samples of fluids are injected into a column. For example, samples of substantially less than 1 ml. and of the order of 1 to 40 microliters may be introduced into a chromatographic column through which an eluting gas flows. In some operations, it is desired to introduce such samples repeatedly and continually. Further, it is desired to introduce samples of varying volume without disturbing the gas chromatographic column installation. It is also desired to have a minimum hold up of samples in "dead" space and to utilize a minimum of sample to flush the sampling chamber.

It is therefore a particular object of this invention to provide a system for injecting small samples of fluids into a chromatographic column or system which avoids the difficulties heretofore encountered. It is a further object of the invention to provide a measuring valve structure which is rugged in construction, is fool-proof in operation, is versatile with respect to the sample size, yet is well adapted for introducing uniform selected volumes of fluids and requires a minimum amount of flushing with the test sample. An additional object is to provide an apparatus which is particularly well suited for the automatic continuous introduction of samples. An additional object is to prevent the inclusion of air with the fluid sample during its introduction into the column. Still another object of the invention is to provide an apparatus which is of such construction as to minimize leaks of samples. A further object of the invention is to provide a means of venting the front end of a chromatographic column to permit reverse flow through the column without additional valves. Another object is to provide a means of introducing a sample into such a column by a single motion of one moving part. These and other objects of the invention will become apparent as the description thereof proceeds.

Briefly, the objects of the invention are attained by providing a valve which is of the plug and body cock-type in which the sample size is governed by a replaceable loop which can be connected to several different conduits by a series of bores or channels in the plug. Each channel or bore has its inlet and outlet terminating at the body wall and rotation of the plug brings such channels into register with a plurality of exterior conduits. Tubes connected to the flowing stream into which the sample is being injected divert the stream through the plug to effect flow of fluid through selected channels and the sample loop when it is desired to inject the sample therefrom.

Figure 2:
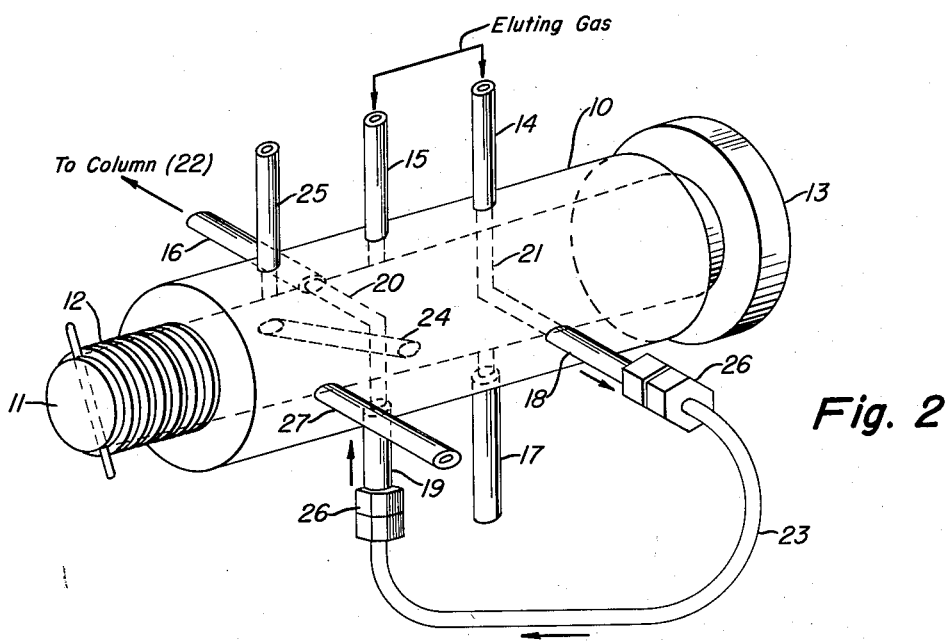
Figure 3:
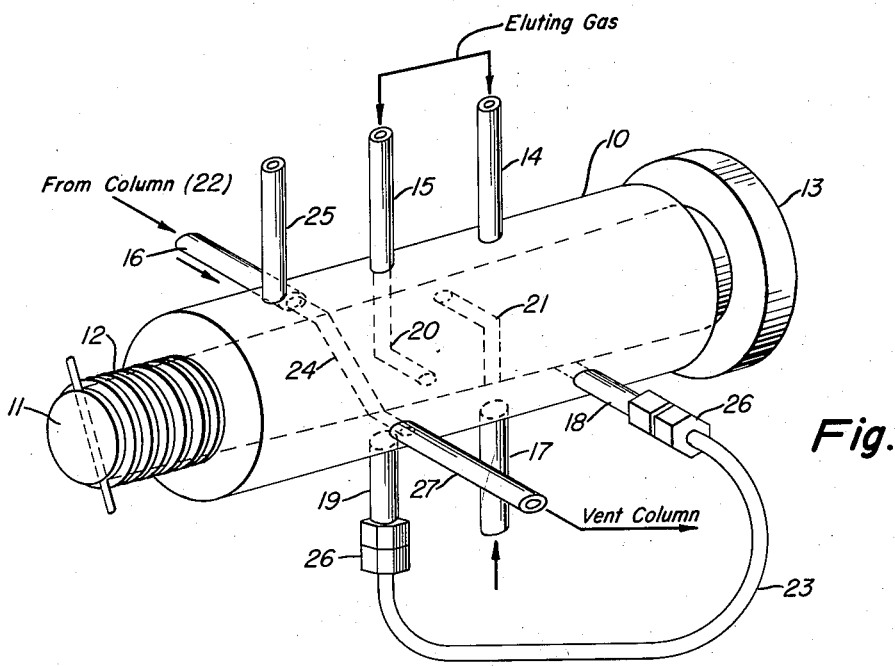
Figure 4:
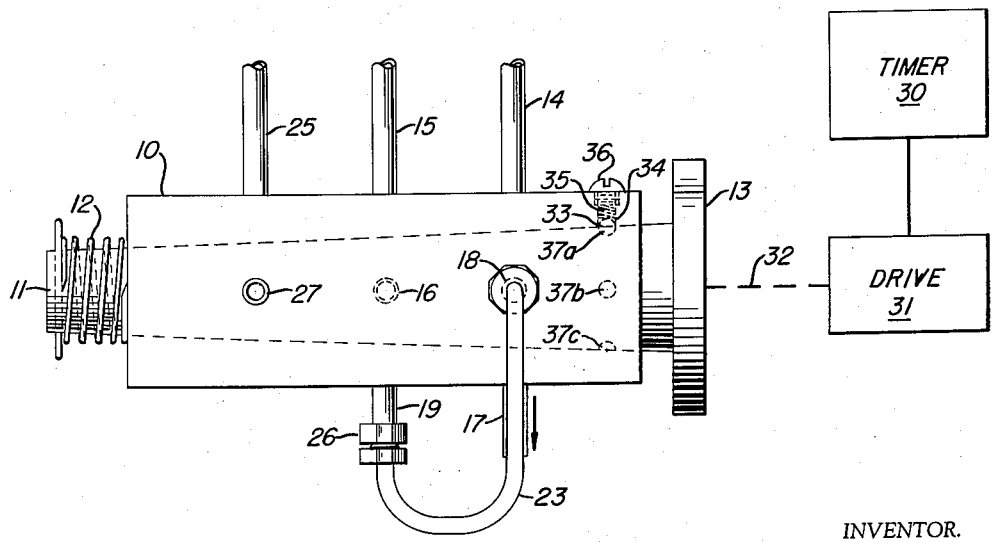

Further details and advantages of the invention will be described in connection with the accompanying drawings illustrating a preferred embodiment wherein:

Figures 1, 2 and 3 are similar views in perspective with the valve plug rotated to selected positions; and Figure 4 is a schematic view of an automatic system employing the sampler device.

Referring to the drawings, the valve mechanism comprises a body 10 made of brass or stainless steel and a plug 11 made of self-lubricating plastic such as Teflon or Kel–F. The plug 11 is held in place by a spring assembly 12 and is turned by handle 13. Several tubes or conduits 14, 15, 16, 17, 18 and 19 lead into the body 10 as shown.

Tubes 14 and 15 are manifolded together so that eluting gas supply may enter one or the other when the 90° bores 20 or 21 are aligned with the tubes 14 and 15. Tubes 14 and 15 are manifolded together and serve to introduce the eluting gas; these tubes, together with sample outlet tube 25 are spaced along a longitude of plug 11. Similarly, sample collecting tube 26 and column vent tube 27 are spaced along a second longitude located substantially 90 degrees from the first longitude; sample inlet tube 17 and sample collecting tube 26 are spaced along a third longitude which is substantially 90 degrees from the second longitude and diametrically opposite the first longitude; and chromatography column communication tube 16 is located substantially 90 degrees from the third longitude.

When the valve is in position as shown in Figure 1, eluting gas passes through tube 15, bore 20 and into tube 16 which leads to the column 22. In this position, the sample loop 23 can be filled by purging the sample into tube 17 and through bore 21, tube 18, the loop 23 tube 19, diagonal bore 24 and finally out tube 25. Bore 20 is a 90° bore which connects tube 16 with tube 15 or 19. Bore 21 is a 90° bore which connects the tube 18 with tube 17 or tube 14, depending upon the position of the plug 11 as determined by the rotation of the handle 13. If desired handle 13 can be indexed to indicate upon inspection the position of the plug 11.

To charge the sample from the loop 23 to the column 22, the plug 11 is turned 90° counter-clockwise to the position illustrated in Figure 2. The eluting gas passes through the tube 14 and displaces the sample from bore 21, tube 18, loop 23, and tube 19 through bore 20, tube 16 and into the column 22. The sample loop 23 is connected to tubes 19 and 18 by compression fittings 26. The volume of the sample to be charged can be varied by interchanging loops 23 of different size.

Sometimes it is desired to vent or back-elute the column 22. This is a particularly useful procedure when the heavy ends are to be removed from the column 22 by reverse elution. This can be effected in a convenient and positive manner by the described apparatus. The plug 11 of the valve is turned to align diagonal bore 24 with tubes 16 and 27 as shown in Figure 3. In this position the flow of eluting gas through tubes 14 and 15 is blocked by the plug 11 and the column 22 can be back-flushed by flowing eluting gas from the column 22 through tube 16, diagonal bore 24 and out through tube 27.

Figure 4 schematically illustrates a means of utilizing the device of Figures 1, 2 and 3 in an automatic and controlled manner. A timer 30 controls the drive means 31 which in turn positions the plug 11 in accordance with a pre-selected program of operation through drive link 32. Such program may be correlated with sample introduction, preparation of associated chromatographic columns (not shown) for analysis, introduction of the sample into the prepared column, analysis of the sample, segregation of the spent column for subsequent use, and back-flushing of the selected column when desired. It should be understood further that I may employ a plurality of valves with individual drive means 31—32 controlled by a program timer 30 or the like.

If desired, a stop mechanism such as shown in Figure 4 may be provided. It comprises a ball 33 which is held at the bas of a bore 34 by a spring 35 and a threaded follower 36. The bore 34 is drilled into the body 10 in such a manner that the ball 33 extends only about one-third its diameter below the surface of the plug 11. The surface of the plug 11 is provided with three recesses 37A, 37B and 37C which are so located that when the ball 33 is seated in any one recess the appropriate bores 20, 21 and 24 are aligned with the proper conduits such as 17—18, 15—16 and 25—27. The spring-loaded ball re-enters the bore 34 when the plug 11 is rotated between the indexed positions. The effect of this assembly is to assure that the plug is and remains in proper register with the intended bores and conduits.

In routine analytical procedures of the type to which this invention relates, it is essential that the apparatus be capable of repeatedly delivering samples of uniform or known size. It is also important that contamination of the samples be avoided and of lubricant-free construction. The apparatus delivers accurate and precise samples with a minimum of sample hold-up and without any contamination of samples due to lubricants.

Flow is direct through all conduits and bores of the valve assembly and there are no "dead" pockets. This permits the introduction of small samples necessary for satisfactory chromatographic separations and further requires a minimum amount of sample to flush and fill the sample section.

Analytical procedures are simplified significantly by the use of my device thereby making possible the adaptation of gas chromatography to automatic analyses. However, the construction of my measuring and injection systems is such as to minimize leakage of sample and the operator can be assured that a full sample is injected into the column.

From the above it will be apparent that I have attained the objects of the invention and although the apparatus has been described with reference to a preferred embodiment thereof, it is to be understood that this is by way of illustration only. Accordingly, it is contemplated that modifications and variations may be made in the apparatus by those skilled in the art and in view of my description without departing from the spirit and scope of the invention.

What is claimed is:

A unitary mechanism for valving a gas chromatography column which comprises: a valve of the plug and body cock type heaving a rotatable tapered self-lubricating plug member in the valve body; means for urging said plug member axially of said body to maintain the inner wall of the body and the outer wall of the plug member in gas-sealing contact; eight tubes communicating through said valve body and extending to said plug member, including first and second manifolded eluting gas tubes and a sample outlet tube in spaced arrangement along a first longitude, a first sample collecting tube and a column vent tube in spaced arrangement along a second longitude located substantially 90 degrees from the first longitude, a sample inlet tube and a second sample collecting tube in spaced arrangement along a third longitude located substantially 90 degrees from said second longitude and diametrically opposite said first longitude, and a chromatographic column communication tube located substantially 90 degrees from said third longitude; a replaceable sample measuring loop exterior of said valve body and communicating with said first sample collecting tube and said second sample collecting tube; and said plug member containing three gas-conducting bores registering, respectively, (1) in a first angular position with the sample inlet tube and the first sample collecting tube, with the second eluting gas tube and the chromatographic column communication tube, and with the second sample collecting tube and the sample outlet tube, whereby to pass eluting gas through the chromatographic column and to fill the sample measuring loop with a gas sample, (2) in a second angular position with the first eluting gas tube and the first sample collecting tube, and with the second sample collecting tube and the chromatographic column communication tube, whereby to charge the sample from the sample measuring loop to the chromatographic column, and (3) in a third angular position with the chromatographic column communication tube and the column vent tube, whereby to permit venting or back-eluting the column.

References Cited in the file of this patent

UNITED STATES PATENTS

| 1,873,010 | Mitton | Aug. 23, 1932 |
| 2,591,762 | Zaikowsky | Apr. 8, 1952 |
| 2,757,541 | Watson | Aug. 7, 1956 |
| 2,833,151 | Harvey | May 6, 1958 |

FOREIGN PATENTS

| 1,121,322 | France | Apr. 30, 1956 |

OTHER REFERENCES

Article entitled "Gas Partition Analysis of Light Ends in Gasolines," by Lichtenfels et al., published in Analytical Chemistry, vol. 28, pages 1376–1379, September 1956.